(12) United States Patent
Chang et al.

(10) Patent No.: US 8,251,409 B2
(45) Date of Patent: Aug. 28, 2012

(54) COVER LATCHING MECHANISM FOR ELECTRONIC DEVICE

(75) Inventors: Chih-Chiang Chang, Taipei Hsien (TW); Zhi Li, Shenzhen (CN); Zhi-Yun Shen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 568 days.

(21) Appl. No.: 12/484,313

(22) Filed: Jun. 15, 2009

(65) Prior Publication Data

US 2009/0322191 A1    Dec. 31, 2009

(30) Foreign Application Priority Data

Jun. 26, 2008  (CN) .......................... 2008 1 0302328

(51) Int. Cl.
*E05C 1/02* (2006.01)
*E05C 1/00* (2006.01)

(52) U.S. Cl. ........ 292/137; 292/1; 292/80; 292/DIG. 11
(58) Field of Classification Search ................. 292/1, 80, 292/81, 83, 86, 87, 91, 137, DIG. 11
See application file for complete search history.

(56) References Cited

U.S. PATENT DOCUMENTS

| 1,632,863 | A | * | 6/1927 | Weber | ............................. 292/80 |
| 4,685,558 | A | * | 8/1987 | Filiz et al. | ....................... 206/1.5 |
| 5,706,968 | A | * | 1/1998 | Riley | ............................. 220/326 |
| 5,803,537 | A | * | 9/1998 | Langmeser et al. | ..... 297/188.19 |
| 5,931,513 | A | * | 8/1999 | Conti | ............................. 292/87 |
| 7,441,813 | B2 | * | 10/2008 | Qin et al. | ....................... 292/163 |

* cited by examiner

*Primary Examiner* — Carlos Lugo
(74) *Attorney, Agent, or Firm* — Altis Law Group, Inc.

(57) ABSTRACT

A cover latching mechanism for an electronic device includes a housing and a cover slidably mounted with the housing. The housing has a latching member and at least one limiting member. The cover has a cover body and a guiding rail formed on the cover body. The guiding rail is slidably mounted with the latching member. The limiting member is for preventing the guiding rail sliding apart from the housing.

12 Claims, 3 Drawing Sheets

COVER LATCHING MECHANISM FOR ELECTRONIC DEVICE

BACKGROUND

1. Technical Field

The present disclosure generally relates to cover latching mechanisms, specifically to cover latching mechanisms for electronic devices, such as mobile phones.

2. Description of Related Art

Portable electronic devices such as digital cameras, mp3 players, video cameras, mobile phones, and personal digital assistants (PDAs) are widely used. Such portable electronic devices often use memory cards to store data and applications.

In some electronic devices, the memory cards are detachably received in the housings of the electronic devices. The memory card has a first electronic interface element. The housing of the electronic device has an opening in a wall thereof. A second electronic interface element is provided in the housing and exposed by the opening. When the memory card is used, the first electronic interface element is inserted into the second electronic interface element through the opening. This enables connectivity of the memory card and the electronic devices to facilitate data transfer between each. However, when no memory card is connected to the electronic device, the second electronic interface element of the electronic device is exposed to outside and liable to be polluted by dust and/or water. Consequently, the performance of the second electronic interface element is liable to be degraded.

Therefore, there is room for improvement within the art.

BRIEF DESCRIPTION OF THE DRAWINGS

Many aspects of the present cover latching mechanism can be better understood with reference to the following drawings. The components in the drawings are not necessarily drawn to scale, the emphasis instead being placed upon clearly illustrating the principles of the present cover latching mechanism. Moreover, in the drawings, like reference numerals designate corresponding parts throughout the several views.

DETAILED DESCRIPTION

Figure 1:
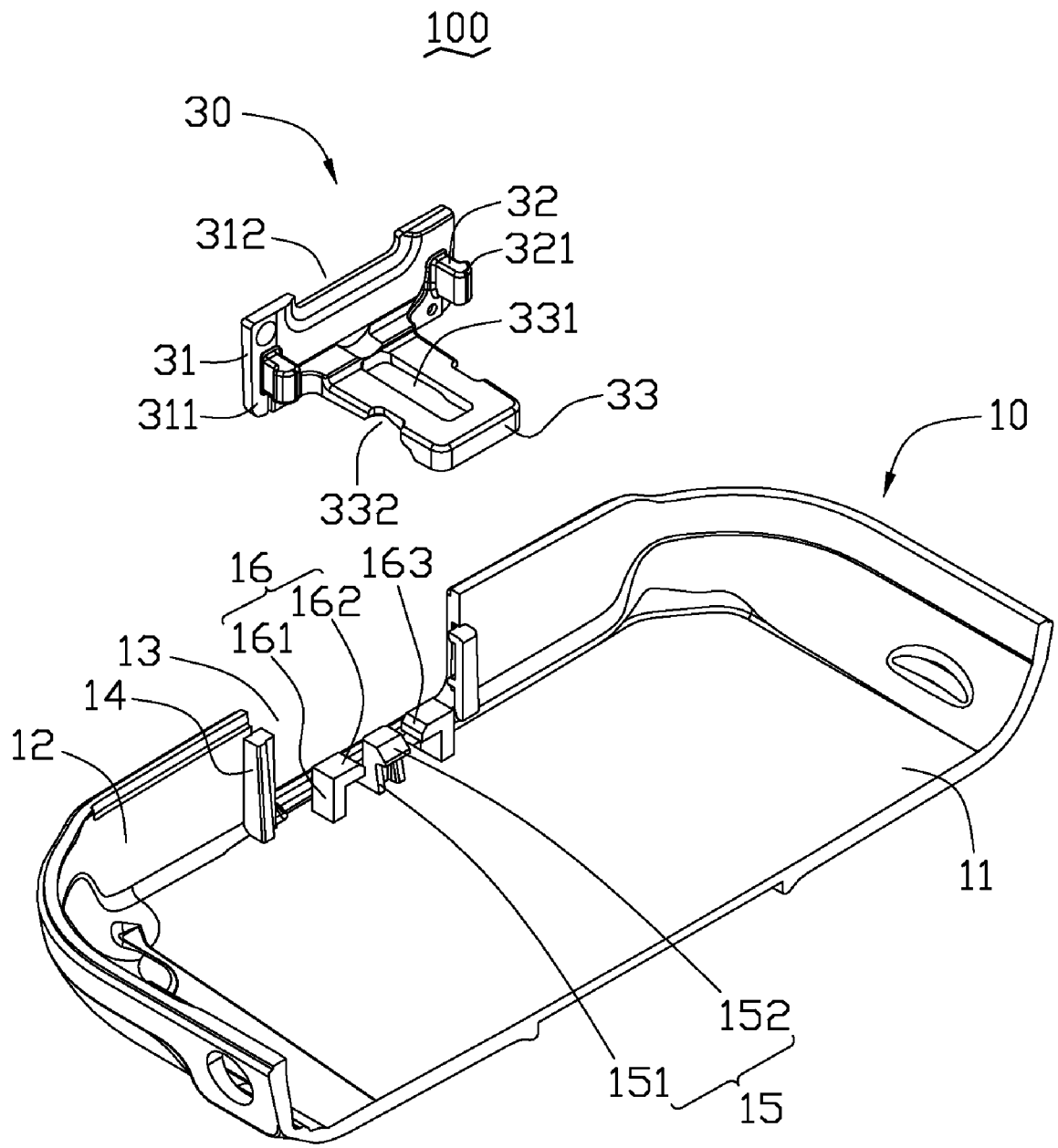
FIG. 1 is an explored, isometric view of a cover latching mechanism, according to an exemplary embodiment.
Figure 2:
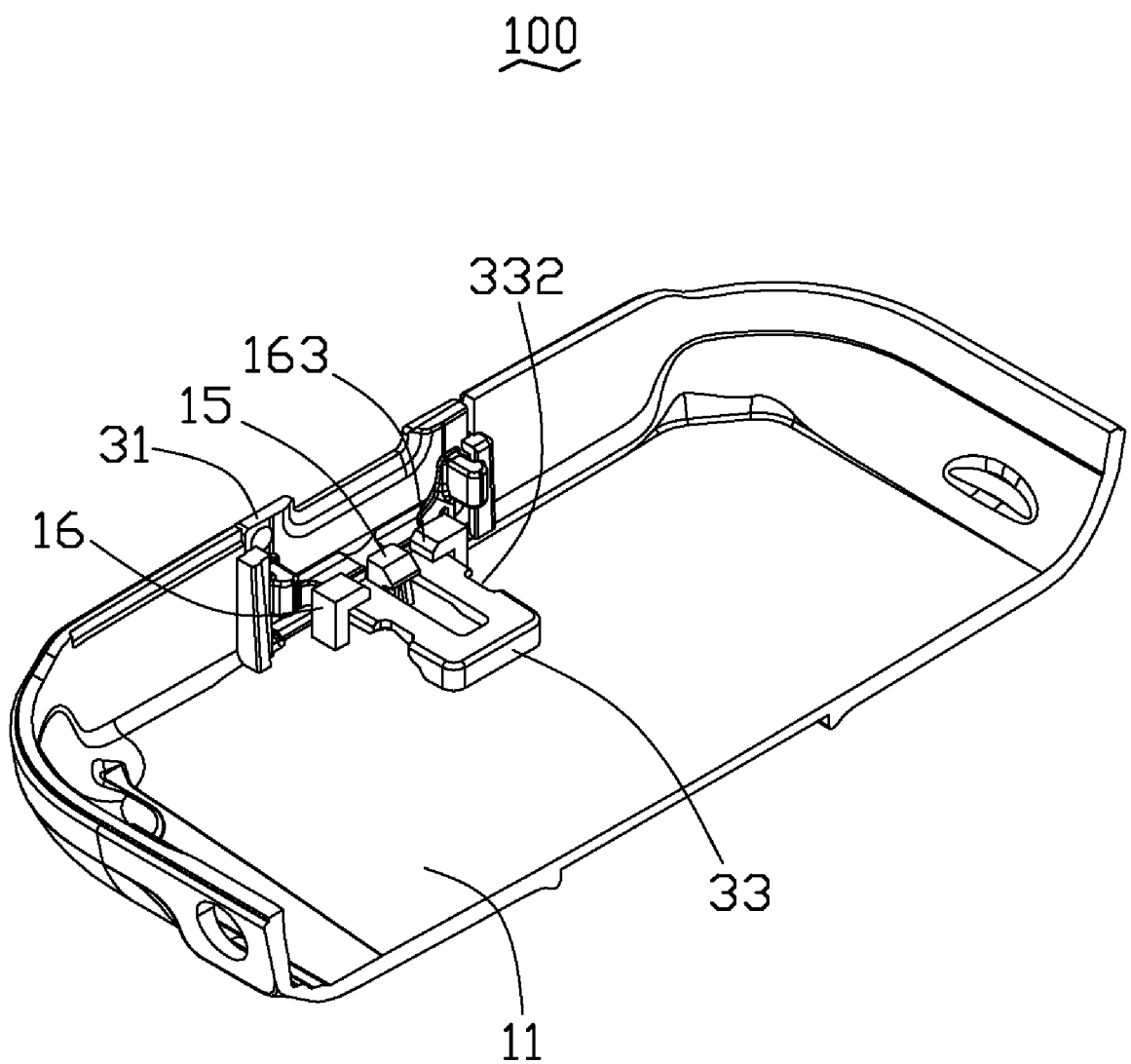
FIG. 2 is an assembled, isometric view of the cover latching mechanism shown in FIG. 1, wherein the cover latching mechanism is in a latched position.

FIGS. 1-2 show a cover latching mechanism 100 for an electronic device including a housing 10 and a cover 30 slidable relative to the housing 10.

The housing 10 has a bottom board 11 and a side wall 12 extending from a circumferential edge of the bottom board 11. The side wall 12 defines an opening 13 and forms a positioning bar 14 at each edge of the opening 13. A latching member 15 and two limiting members 16 are formed on the bottom board 11 and adjacent the opening 13. The latching member 15 is L-shaped and has a latching body 151 and a projection 152. The latching body 151 extends perpendicularly from the bottom board 11. The projection 152 extends from a distal end of the latching body 151 and away from the opening 13. Each limiting member 16 is formed at each side of the latching member 15. Each limiting member 16 is L-shaped and has a limiting body 161 and a limiting projection 162 extending perpendicularly from a distal end of the limiting body 161 and towards the latching member 15. The end of each limiting projection 162 has a wedge-shaped surface 163.

The cover 30 includes a cover body 31, two locking portions 32, and a guiding rail 33. The cover body 31 is made of hard plastic, e.g., admixture of acrylonitrile-butadiene-styrene and polycarbonate. The cover body 31 has an inner surface 311 and defines an operating cutout 312 through one end thereof. The locking portions 32 are made of a softer plastic, e.g., thermoplastic urethanes. Each locking portion 32 is formed on the inner surface 311 and respectively at each end of the cover body 31. Each locking portion 32 has a clasp 321 extending from a distal end thereof and each clasp 321 extends away from each other. Each locking portions 32 is for resisting the positioning bar 14 of the housing 10. The guiding rail 33 is fixed on the inner surface 311 and formed between the locking portions 32. The guiding rail 33 is made of a softer plastic, and advantageously made of thermoplastic urethanes. The guiding rail 33 defines a central channel 331. The latching body 151 of the latching member 15 is slidably received in the channel 331. The guiding rail 33 defines mounting cutouts 332 in each edge thereof and the guiding rail 33 is mounted with the housing 10 by the limiting projections 162 respectively travel through a corresponding mounting cutout 332. The cover body 31, the locking portions 32, and the guiding rail 33 can be integrally formed by dual-molding.

In assembly, each mounting cutout 332 of the cover 30 faces a corresponding wedge-shaped surface 163 of the limiting member 16 of the housing 10, then the guiding rail 33 is pressed downwardly to elastically deform the limiting projections 162 so that the limiting projections 162 travel through the mounting cutouts 332 thereby mounting the cover 30 with the housing 10. The limiting projections 162 resist the guiding rail 33 to limit the movement of the guiding rail 33 in a vertical direction. The guiding rail 33 is located between the limiting bodies 161 and the latching member 15 is received in the channel 331. The cover body 31 is pushed towards the housing 10 and the latching member 15 slides in the channel 331, until the locking portions 32 reach the positioning bars 14. The cover body 31 is further pushed to elastically deform the clasps 321 to slide over the positioning bars 14 and resist the positioning bars 14. Thus, the cover latching mechanism 100 is assembled, as represented in FIG. 2.

Figure 3:
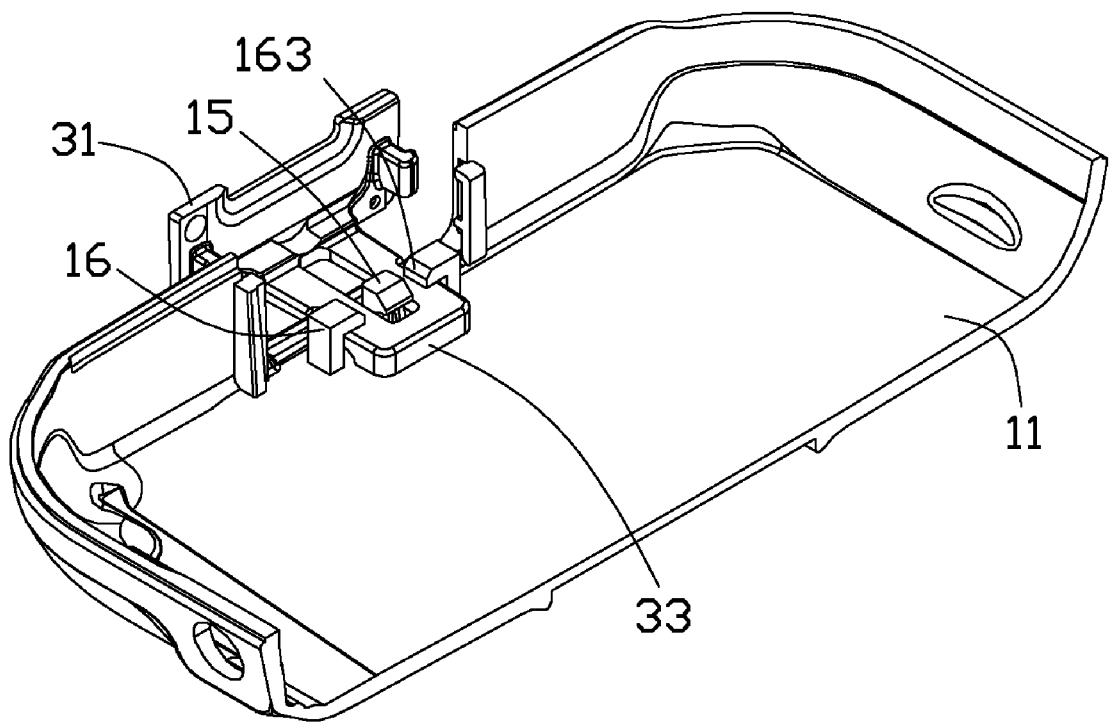
FIG. 3 is an assembled, isometric view of the cover latching mechanism shown in FIG. 1, wherein the cover latching mechanism is in an unlatched position.

FIG. 3 shows an unlatched (i.e., opened) position of the cover latching mechanism 100. To open the cover 30, the cover body 31 is pulled away from the housing 10 by the operating cutout 312. The locking portions 32 are elastically deformed to release from the positioning bars 14. The guiding rail 33 slides relative to the latching member 15, until the latching member 15 abuts against one end of the guiding rail 33. Thus, the cover body 31 moves away from the housing 10, forming a gap between the cover body 31 and the side wall 12. A plug can be inserted into the housing 10 through the gap and the opening 13.

The present cover latching mechanism 100 is simple to assemble. The cover 30 cannot release from the housing 10 due to the engagement of the projection 152 and the guiding rail 33, and the engagement of the positioning bars 14 and the locking portions 32.

It should be understood that the locking portions 32 and the positioning bars 14 may be omitted, and the cover body 31 may directly resist the side wall 12 of the housing through the opening 13. The housing 10 may include only one limiting member 16.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover latching mechanism for an electronic device, comprising:
    a housing defining an opening and having a latching member, a bottom board, a pair of positioning bars, and a pair of limiting members, the positioning bars respectively formed at two edges of the opening; and
    a cover slidably mounted with the housing, the cover having a cover body, a pair of locking portions formed on an inner surface of the cover body and respectively positioned at two ends of the cover body, and a guiding rail formed on the cover body, the guiding rail being slidably mounted with the latching member, and being positioned between the bottom board and the limiting members to prevent the guiding rail sliding apart from the housing;
    wherein when the cover is closed, the locking portions respectively latch the positioning bars to maintain the cover; and when the cover is opened, the locking portions are deflected and separated from the positioning bars, and the latching member engages with the guiding rail to maintain the cover being attached to the housing.

2. The cover latching mechanism of claim 1, wherein the latching member is L-shaped and includes a latching body and a projection, the latching body extends perpendicularly from the bottom board, and the projection extends from a distal end of the latching body and away from the opening of the housing.

3. The cover latching mechanism of claim 2, wherein the guiding rail is formed between the locking portions and defines a central channel, and the latching body of the latching member is slidably received in the central channel.

4. The cover latching mechanism of claim 3, wherein the guiding rail defines mounting cutouts in each edge thereof and the guiding rail is mounted with the housing through the mounting cutouts.

5. The cover latching mechanism of claim 4, wherein each of the limiting members has a limiting body perpendicularly mounted on the bottom board and a limiting projection extending perpendicularly from a distal end of the limiting body and towards the latching member, and the guiding rail is mounted with the housing by the limiting projection travels through one of the mounting cutouts.

6. The cover latching mechanism of claim 1, wherein the cover body is made of an admixture of acrylonitrile-butadiene-styrene and polycarbonate.

7. The cover latching mechanism of claim 1, wherein the locking portions and the guiding rail are made of thermoplastic urethanes.

8. The cover latching mechanism of claim 1, wherein the cover body, the locking portions, and the guiding rail are integrally formed by dual-molding.

9. The cover latching mechanism as claimed in claim 5, wherein the guiding rail is positioned between the bottom board and the limiting projections, and the limiting projections limit movements of the guiding rail which are perpendicular to and away from the bottom board.

10. The cover latching mechanism as claimed in claim 9, wherein the guiding rail is substantially U-shaped and includes two substantially parallel arms, distal ends of the two arms are both connected to the cover body, and the central channel is formed between the two arms.

11. The cover latching mechanism as claimed in claim 10, wherein each of the arms is positioned between a corresponding one of the limiting projections and the bottom board.

12. The cover latching mechanism as claimed in claim 10, wherein the mounting cutouts are respectively defined in outer edges of the two arms.

\* \* \* \* \*